(12) United States Patent
Hirokawa

(10) Patent No.: US 11,451,557 B2
(45) Date of Patent: Sep. 20, 2022

(54) SERVICE SYSTEM AND INFORMATION REGISTRATION METHOD

(71) Applicant: Takahiro Hirokawa, Kanagawa (JP)

(72) Inventor: Takahiro Hirokawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 222 days.

(21) Appl. No.: 16/892,829

(22) Filed: Jun. 4, 2020

(65) Prior Publication Data

US 2020/0412738 A1 Dec. 31, 2020

(30) Foreign Application Priority Data

Jun. 28, 2019 (JP) .............................. JP2019-122460

(51) Int. Cl.
*H04L 9/40* (2022.01)

(52) U.S. Cl.
CPC ............ *H04L 63/105* (2013.01); *H04L 63/08* (2013.01)

(58) Field of Classification Search
CPC .............................. H04L 63/105; H04L 63/08
See application file for complete search history.

(56) References Cited

U.S. PATENT DOCUMENTS

| | | | | |
|---|---|---|---|---|
| 7,657,926 | B1* | 2/2010 | Baker | H04L 63/0263 726/2 |
| 8,763,145 | B2 | 6/2014 | Mihara | |
| 9,191,381 | B1* | 11/2015 | Popp | H04L 63/0823 |
| 9,503,482 | B1* | 11/2016 | Hugenbruch | H04L 63/105 |
| 9,516,473 | B1* | 12/2016 | Haapanen | H04W 4/029 |
| 9,754,088 | B2 | 9/2017 | Ohzaki et al. | |
| 10,230,709 | B1* | 3/2019 | Kanakarajan | H04L 41/28 |
| 10,306,080 | B2 | 5/2019 | Uchibori et al. | |
| 10,554,654 | B1* | 2/2020 | Ramanathan | H04L 63/104 |
| 10,871,948 | B1* | 12/2020 | Dowling | H04L 9/3239 |
| 10,891,588 | B1* | 1/2021 | Wilczek | G06Q 10/06313 |
| 2003/0196108 | A1* | 10/2003 | Kung | H04L 9/3268 713/175 |

(Continued)

FOREIGN PATENT DOCUMENTS

| | | |
|---|---|---|
| JP | 5814639 | 11/2015 |
| JP | 6372311 | 8/2018 |

*Primary Examiner* — Aravind K Moorthy
(74) *Attorney, Agent, or Firm* — IPUSA, PLLC

(57) ABSTRACT

A service system includes a server that provides a service as a cloud service, and a device that receives the service, wherein a terminal device that is operated by a contract administrator sends identification information of the contract administrator and information related to a contract of the service, to the server, and wherein the server includes a user information storage unit that specifies a role associated with the identification information of the contract administrator, a communication unit that receives the identification information of the contract administrator and the information related to the contract, and an information registration unit that registers the identification information of the contract administrator, contract identification information generated based on the contract, and an operation privilege related to the contract based on the role specified in the user information storage unit, in association with each other, in a contract operation privilege information storage.

6 Claims, 12 Drawing Sheets

(56) References Cited

U.S. PATENT DOCUMENTS

| | | | | |
|---|---|---|---|---|
| 2004/0093526 | A1* | 5/2004 | Hirsch | H04L 63/105 726/21 |
| 2004/0103323 | A1* | 5/2004 | Dominic | H04L 63/126 726/4 |
| 2005/0125677 | A1* | 6/2005 | Michaelides | H04L 63/08 713/185 |
| 2006/0089932 | A1* | 4/2006 | Buehler | G06F 21/6218 707/999.009 |
| 2006/0090208 | A1* | 4/2006 | Smith | H04L 63/105 713/166 |
| 2007/0169171 | A1* | 7/2007 | Kumar | H04L 63/102 726/2 |
| 2008/0062997 | A1* | 3/2008 | Nix | H04L 29/12066 370/395.2 |
| 2008/0109884 | A1* | 5/2008 | Kulkarni | G06F 21/31 726/5 |
| 2009/0077659 | A1* | 3/2009 | Segawa | H04L 63/08 726/21 |
| 2012/0311672 | A1* | 12/2012 | Connor | G06F 21/604 726/4 |
| 2013/0007891 | A1* | 1/2013 | Mogaki | G06F 21/6218 726/27 |
| 2013/0247165 | A1* | 9/2013 | Pal | H04L 63/102 726/10 |
| 2013/0326588 | A1* | 12/2013 | Jain | G06F 21/41 726/4 |
| 2014/0082723 | A1* | 3/2014 | Schuepp | G05B 19/0428 726/4 |
| 2014/0122568 | A1* | 5/2014 | Nair | H04L 63/10 709/203 |
| 2014/0130136 | A1* | 5/2014 | Chaplik | H04L 63/105 726/4 |
| 2014/0331301 | A1* | 11/2014 | Subramani | H04L 63/104 726/8 |
| 2014/0379828 | A1* | 12/2014 | Zou | H04L 65/1093 709/206 |
| 2015/0046988 | A1* | 2/2015 | Suzuki | H04L 51/00 726/6 |
| 2015/0081837 | A1* | 3/2015 | Bernier | H04W 8/24 709/217 |
| 2016/0057150 | A1* | 2/2016 | Choi | H04L 63/104 726/1 |
| 2016/0337851 | A1* | 11/2016 | Yokoyama | G06F 21/32 |
| 2016/0352760 | A1* | 12/2016 | Mrkos | H04L 67/02 |
| 2017/0041504 | A1 | 2/2017 | Fukuda | |
| 2017/0111336 | A1* | 4/2017 | Davis | H04L 63/0272 |
| 2017/0126681 | A1* | 5/2017 | Barrett | H04L 9/3226 |
| 2017/0147790 | A1* | 5/2017 | Patel | H04L 63/102 |
| 2017/0171831 | A1* | 6/2017 | Seigel | H04W 4/80 |
| 2017/0193172 | A1* | 7/2017 | Melle | G16H 10/60 |
| 2017/0257380 | A1* | 9/2017 | Yao | H04L 63/10 |
| 2017/0264779 | A1* | 9/2017 | Hirahara | H04N 1/00061 |
| 2017/0278201 | A1* | 9/2017 | Mimassi | G06Q 30/0281 |
| 2017/0279774 | A1* | 9/2017 | Booz | G06Q 20/223 |
| 2018/0121646 | A1 | 5/2018 | Sakanashi et al. | |
| 2018/0268124 | A1 | 9/2018 | Ohzaki et al. | |
| 2018/0270246 | A1 | 9/2018 | Fukuda et al. | |
| 2018/0278715 | A1 | 9/2018 | Uchibori et al. | |
| 2018/0349621 | A1* | 12/2018 | Schvey | H04L 9/0637 |
| 2018/0365686 | A1* | 12/2018 | Kondo | G06Q 20/382 |
| 2019/0035038 | A1* | 1/2019 | Follis | G06F 21/32 |
| 2019/0065593 | A1* | 2/2019 | Barski | G06F 16/95 |
| 2019/0081796 | A1* | 3/2019 | Chow | G06Q 20/02 |
| 2019/0095594 | A1 | 3/2019 | Uchibori | |
| 2019/0116174 | A1* | 4/2019 | Gray | H04L 63/029 |
| 2019/0164136 | A1* | 5/2019 | Gray | G06Q 20/06 |
| 2019/0182337 | A1* | 6/2019 | Chittaro | H04L 67/104 |
| 2019/0188362 | A1 | 6/2019 | Uchibori | |
| 2019/0188411 | A1* | 6/2019 | Kroutik | H04L 9/3297 |
| 2019/0260754 | A1* | 8/2019 | Hecht | H04L 63/102 |
| 2019/0273607 | A1* | 9/2019 | Van Der Velden | H04L 9/088 |
| 2019/0288853 | A1* | 9/2019 | Gray | H04L 9/3247 |
| 2019/0306171 | A1* | 10/2019 | Sisley | G06F 21/6218 |
| 2019/0325044 | A1* | 10/2019 | Gray | G06Q 20/3829 |
| 2019/0384893 | A1* | 12/2019 | Suda | G06F 21/10 |
| 2020/0007311 | A1* | 1/2020 | Oberhofer | G06F 21/45 |
| 2020/0007549 | A1* | 1/2020 | Gormley | H04L 63/102 |
| 2020/0044856 | A1* | 2/2020 | Lynde | H04L 9/0618 |
| 2020/0057860 | A1* | 2/2020 | Patil | G06F 21/6209 |
| 2020/0167339 | A1* | 5/2020 | Manevich | H04L 9/0637 |
| 2020/0244563 | A1* | 7/2020 | Coupal | H04L 43/18 |
| 2020/0259922 | A1* | 8/2020 | Shim | H04L 41/0806 |
| 2020/0267006 | A1* | 8/2020 | Nyman | H04L 63/062 |
| 2020/0285631 | A1* | 9/2020 | Kwatra | H04L 63/1416 |
| 2020/0322136 | A1* | 10/2020 | Irazabal | H04L 9/3239 |
| 2020/0327250 | A1* | 10/2020 | Wang | H04L 9/0897 |
| 2021/0119785 | A1* | 4/2021 | Ben-Reuven | H04L 63/126 |

* cited by examiner

FIG.5

USER TABLE

| USER ID | ROLE |
|---|---|
| user0001 | TENANT ADMINISTRATOR |
| user0002 | CONTRACT ADMINISTRATOR |
| user0003 | USER |

FIG.6

DEVICE TABLE

| DEVICE ID | DEVICE NAME |
|---|---|
| d0001 | MFP1 |
| d0002 | MFP2 |

FIG.7

USE PRIVILEGE MANAGEMENT TARGET TABLE

| CONTRACT ADMINISTRATOR ID | MANAGEMENT TARGET ID |
|---|---|
| user0002 | user0003. ···. d0001. ··· |
| | |

FIG.8

CONTRACT TABLE

| CONTRACT ID | CONTRACT SERVICE | CONTRACT TYPE | CONTRACT NUMBER |
|---|---|---|---|
| c0001 | SERVICE A | USER | 20 |
| c0002 | SERVICE B | DEVICE | 20 |
| | | | |

FIG.9

CONTRACT OPERATION PRIVILEGE TABLE

| CONTRACT ID | CONTRACT ADMINIS-TRATOR | CONTRACT OPERATION | UPDATE OPERATION | DELETING OPERATION |
|---|---|---|---|---|
| c0001 | user0002 | YES | YES | YES |

FIG.10

USE PRIVILEGE ASSIGNMENT TABLE

| CONTRACT ID | ASSIGNMENT |
|---|---|
| c0001 | user0003. ··· |
|  |  |
|  |  | ated by the server, and an operation privilege related to the contract based on the role associated with the identification information of the contract administrator specified in the user information storage unit, in association with each other, in a contract operation privilege information storage.

SERVICE SYSTEM AND INFORMATION REGISTRATION METHOD

CROSS-REFERENCE TO RELATED APPLICATION

The present application is based on and claims priority under 35 U.S.C. § 119 to Japanese Patent Application No. 2019-122460, filed on Jun. 28, 2019, the contents of which are incorporated herein by reference in their entirety.

BACKGROUND OF THE INVENTION

1. Field of the Invention

The present disclosure relates to a service system and an information registration method.

2. Description of the Related Art

In recent years, various cloud services have been provided in the Internet. In cloud services, there are a single tenant architecture in which a customer exclusively uses one system and a multi-tenant architecture in which multiple customers share one system. In the multi-tenant architecture, a cloud service provider manages a use privilege of a customer based on a contract.

A technique in which a customer's administrator (or a tenant administrator) manages a general user privilege in cloud services, has been known (see, for example, Patent Document 1). Patent Document 1 discloses a service system in which an administrator assigns an access privilege to each general user of a customer who uses a license.

Patent Document 1: Japanese Patent No. 5814639

SUMMARY OF THE INVENTION

According to one aspect of an embodiment, a service system includes a server that provides a service to a contracted tenant as a cloud service, and a device that receives the service provided by the server, wherein the server can communicate with the device through a network, wherein a terminal device that is operated by a contract administrator sends identification information of the contract administrator and information related to a contract of the service, to the server, and wherein the server includes a user information storage unit that stores identification information of a user for each of a plurality of users including the contract administrator, and specifies a role as the contract administrator associated with the identification information of the contract administrator, a communication unit that receives the identification information of the contract administrator and the information related to the contract of the service, and an information registration unit that registers the identification information of the contract administrator, contract identification information generated based on the contract, and an operation privilege related to the contract based on the role associated with the identification information of the contract administrator specified in the user information storage unit, in association with each other, in a contract operation privilege information storage.

BRIEF DESCRIPTION OF THE DRAWINGS

FIG. 5 is a drawing schematically illustrating an example of a user table stored in a user information DB;

FIG. 6 is a drawing schematically illustrating an example of a device table stored in a device information DB;

FIG. 7 is a drawing schematically illustrating an example of a use privilege management target table stored in a use privilege management target information DB;

FIG. 8 is a drawing schematically illustrating an example of a contract table stored in a contract information DB;

FIG. 9 is a drawing schematically illustrating an example of a contract operation privilege table stored in a contract operation privilege information DB;

FIG. 10 is a drawing schematically illustrating an example of a use privilege assignment table stored in a use privilege assignment information DB;

DESCRIPTION OF THE EMBODIMENTS

In a conventional technique, there has been a problem that a role related to management of a contract is not configured. That is, since there has been only a distinction between two roles of a tenant administrator and a general user, there is a risk that a privilege that is more than necessary is given to the general user. For example, the general user might be able to view a contract content of another department or use a use privilege of another department.

In consideration of the above-described problem to be solved, an embodiment of the present invention has an object to provide a service system that can configure a role related to management of a contract.

According to the embodiment of the present invention, a service system that can configure a role related to management of a contract, can be provided.

In the following, as the embodiment of the present invention, a service system and an information registration method performed by the service system will be described with reference to the drawings.

Description of a Service System Operation

Figure 1:
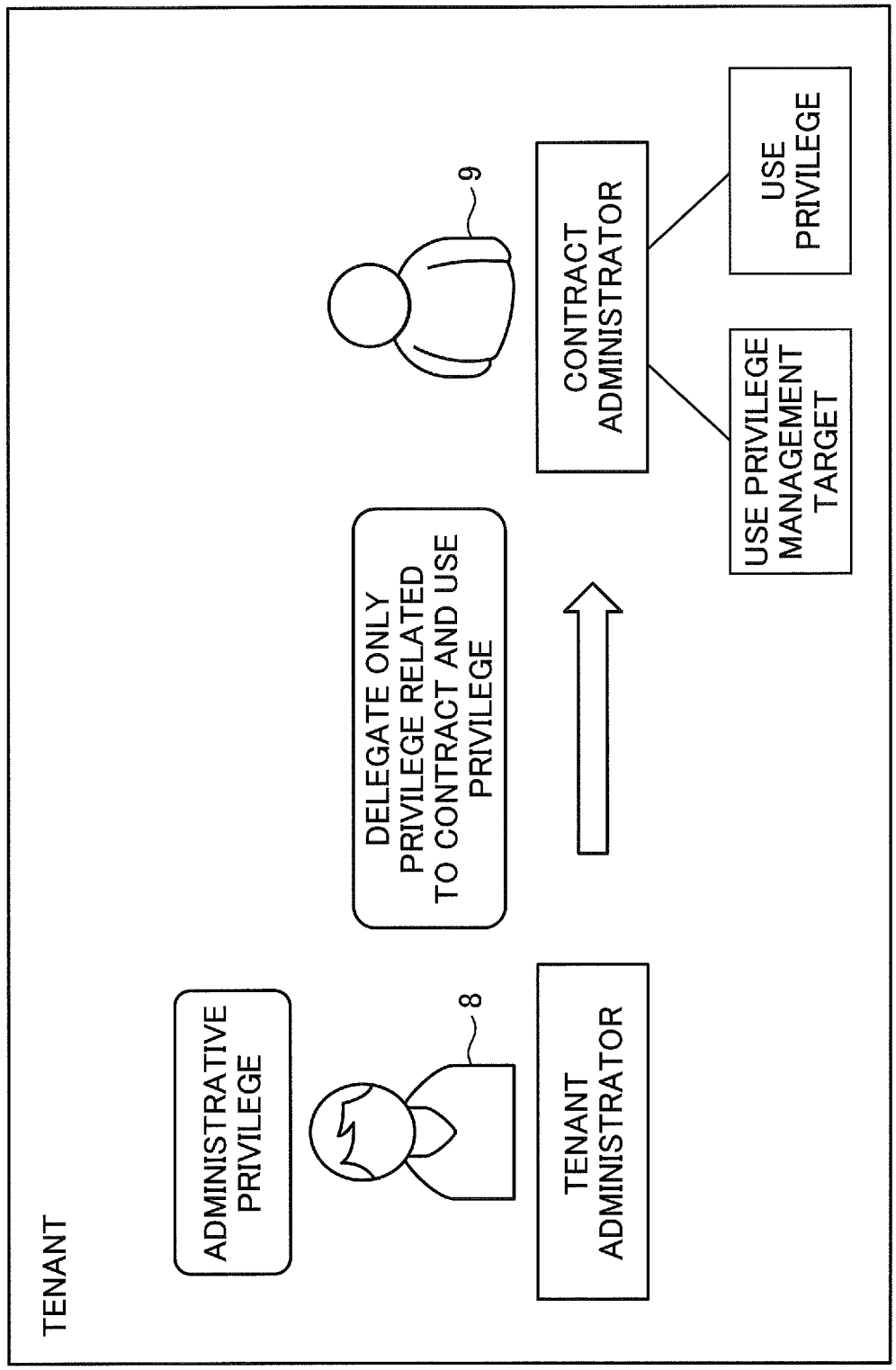
FIG. 1 is a drawing illustrating an overview of a service system operation according to the present embodiment.

FIG. 1 is a drawing illustrating an overview of a service system operation according to the present embodiment. In a tenant, there are a tenant administrator 8 and a contract administrator 9. The contract administrator 9 is appointed by the tenant administrator 8 (i.e., registered in a use privilege management target information DB as described below). The tenant administrator 8 is a person performing an overall management of the tenant and has administrative privileges. The administrative privileges include any privilege given to the tenant, such as a privilege to view the contract contents of another department, a privilege to use the use privilege of another department, and a privilege related to a contract and the use privilege of another department.

The contract administrator 9 can contract a cloud service, and when the contract administrator 9 makes the contract, an operation privilege is associated with identification information of the contract administrator. Additionally, the contract is associated with a general user or a device to be assigned, and the contract administrator 9 is associated with a management target (i.e., the general user or the device).

With such a configuration, a privilege is delegated as follows:

(1) Only a privilege related to the contract and a privilege related to the use privilege among the administrative privileges of the tenant administrator 8 are delegated to the contract administrator 9.

(2) When the contract administrator 9 contracts a cloud service 70, the use privilege, the contract administrator 9, and the use privilege management target are associated.

This limits a privilege to be delegated to the contract administrator 9, thereby preventing an operation that only the tenant administrator 8 has a privilege to perform from being performed by the contract administrator 9 and reducing unintentional erroneous operations. The contract administrator 9 can assign the use privilege to the general user and the device, and can reduce a burden of the tenant administrator 8.

Terminology

A cloud service indicates to provide data and software conventionally used by a computer on hand of a user, to a user through a network as a service.

Tenant is a customer who uses a resource of the cloud service 70. A customer is an organization that has contracted the cloud service 70, such as a company and a local government. From the cloud service 70, the customer is treated as the tenant. A single tenant is an architecture in which a single customer exclusively uses a single system, and a multi-tenant is an architecture in which multiple customers share a single system.

A privilege related to a contract indicates a privilege to make a contract, update a contract, or delete a contract. A privilege related to the use privilege indicates a privilege to set which user or device can use which service.

Delegation indicates to entrust to another person. When a right has been delegated, a person to whom the right has been delegated has the right.

Configuration Example

Figure 2:
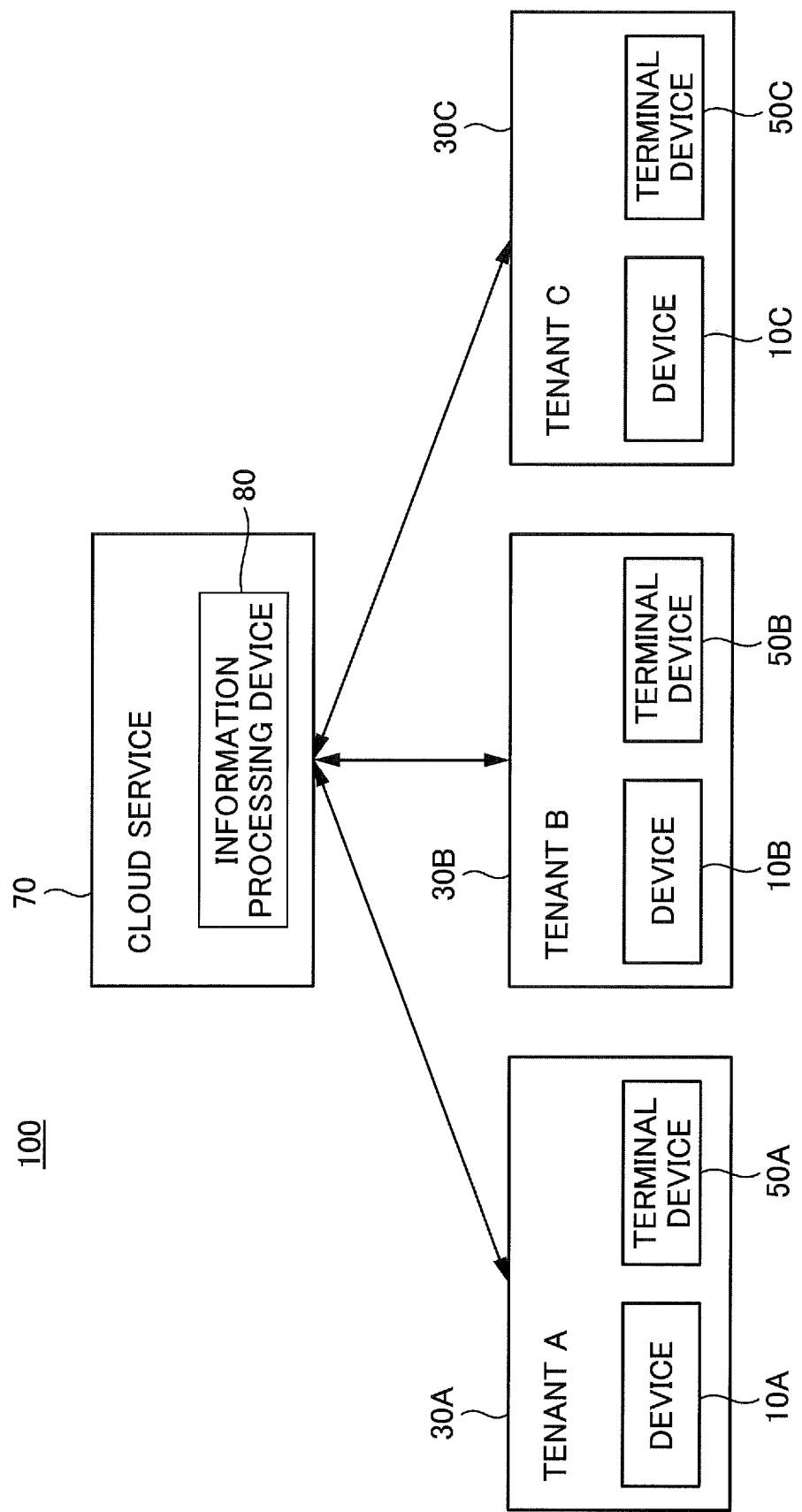
FIG. 2 is a drawing illustrating an overall configuration example of the service system.

FIG. 2 is a drawing illustrating an overall configuration example of a service system 100. As illustrated in FIG. 2, the service system 100 includes one or more tenants (e.g., three tenants A to C in the drawing) and the cloud service 70. Devices 10A to 10C and terminal devices 50A to 50C are respectively provided in tenant 30A to 30C. In the following, any tenant among the tenants 30A to 30C is denoted by "30", any device among the devices 10A to 100 is denoted by "10", and any terminal device 50 among the terminal devices 50A to 50C is denoted by "50". The number of devices 10 and terminal devices 50 arranged in each tenant is only one example, and in many cases, the number of devices 10 and terminal devices 50 is multiple, and increases in accordance with the number of general users.

The tenants 30A to 30C and the cloud service 70 are connected to communicate with each other through a network. The network is, for example, a local area network (LAN) in a corporate network, and corporate networks are connected to each other through a general network such as the Internet. The network may also include a private line such as Wide Area Ethernet (registered trademark) and a virtual private network (VPN). A part or all of the network may be achieved by wireless such as wireless fidelity (Wi-Fi), a cellular line (3G, 4G, LTE (Long Term Evolution), or 5G), and Bluetooth (registered trademark). When a cellular line is used, the cellular line is connected to the network.

The device 10 is assumed to be an office device that communicates with the cloud service 70 from the corporate network such as a network of an office or a factory and that uses the cloud service 70. However, the device 10 is not required to communicate with the cloud service 70 at all times.

The device 10 may be, for example, a multi-function peripheral (MFP) or a multi-function device. Alternatively, the device 10 may be an image forming apparatus, a printer, a printing device, a copy machine, and so on. Further, the device 10 may be a device that communicates with the cloud service 70 and that receives a service, such as an electronic blackboard, a projector, or a video conference terminal, and so on.

The terminal device 50 is a general purpose information processing device that is used by at least one of the tenant administrator 8, the contract administrator 9, and the general user, that uses the cloud service 70, or that is used for a business purpose. In the present embodiment, the terminal device 50 is used when the tenant administrator 8 delegates a privilege to the contract administrator 9, and when the contract administrator 9 makes a contract and assigns the use privilege.

The terminal device 50 may be, for example, a desktop PC, a notebook PC, a smartphone, a mobile phone, a tablet terminal, a personal digital assistant (PDA), a wearable PC, and so on. The terminal device 50 may be an information processing device that can connect to the network and operate browser software.

The cloud service 70 provides various cloud services in accordance with a contract with the tenant to which the general user belongs, when the successfully authorized general user uses the cloud service 70. For example, a workflow list that can be used in the device 10 is sent to the device 10, a workflow creation is accepted, and an application included in the workflow is executed on a cloud side. A workflow is one or more processes executed for electronic data such as image data, and each process is automatically executed in a predetermined order. For example, the general user selects a workflow and starts executing the workflow. When the general user scans the image data by the device 10 in accordance with instructions of the workflow, the image data is sent to the cloud service 70. The cloud service 70, for example, converts the image data into text, translates the text, and stores a result in a predetermined folder.

The cloud service 70 includes one or more information processing devices 80, and the information processing device 80 provides various services as a server.

Hardware Configuration Example

Figure 3:
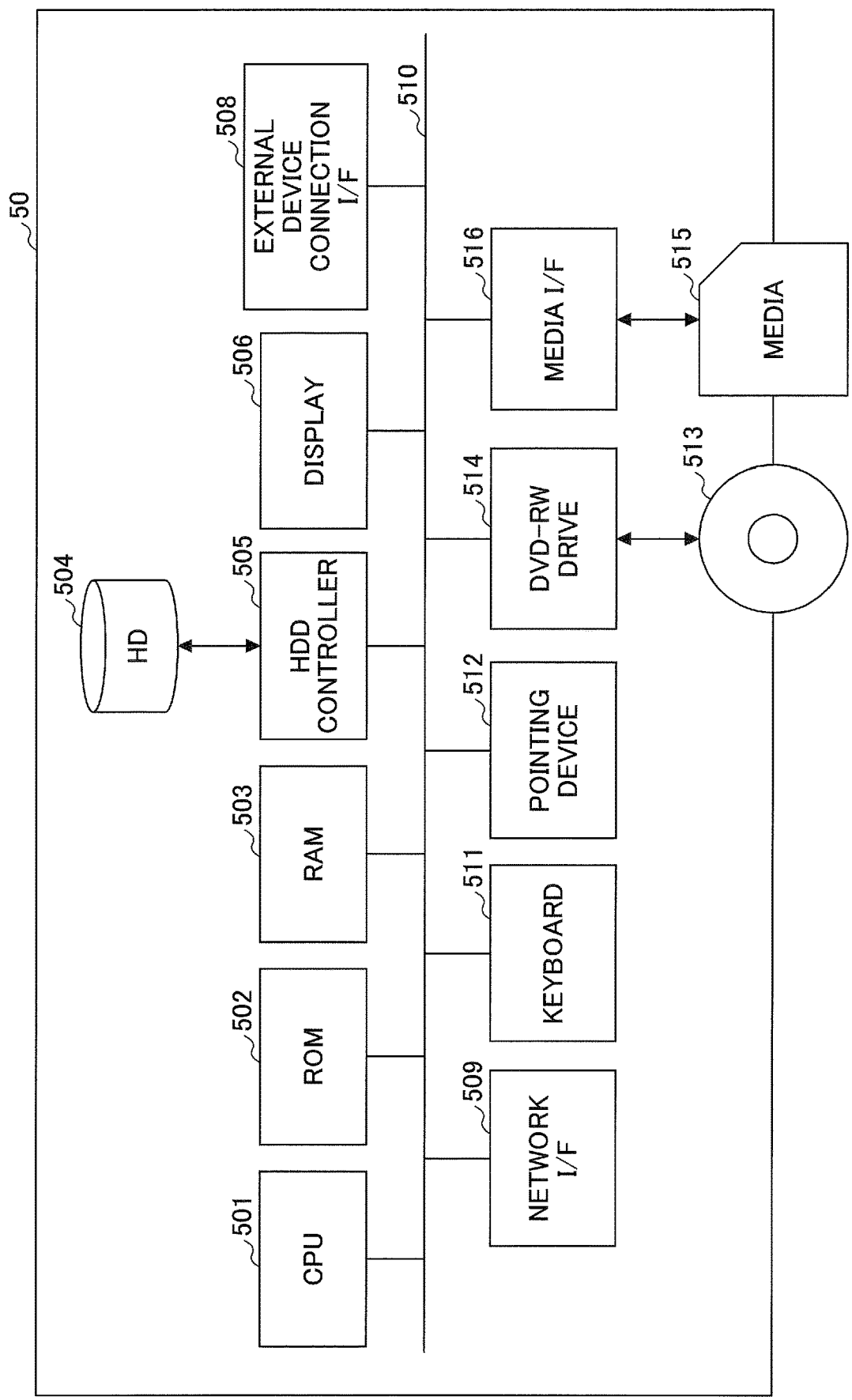
FIG. 3 is a drawing of an example of a hardware configuration of a terminal device.

FIG. 3 is a drawing of an example of a hardware configuration of the terminal device 50. As illustrated in FIG. 3, the terminal device 50 is constituted by a computer and includes a CPU 501, a ROM 502, a RAM 503, an HD 504, a hard disk drive (HDD) controller 505, a display 506, an external device connection interface (I/F) 508, a network I/F 509, a bus line 510, a keyboard 511, a pointing device 512, a digital versatile disk rewritable (DVD-RW) drive 514, and a media I/F 516, as illustrated in FIG. 3.

Among these components, the CPU 501 controls an entire operation of the terminal device 50. The ROM 502 stores a program used to drive the CPU 501, such as an IPL. The RAM 503 is used as a work area of the CPU 501. The HD 504 stores various data such as a program. The HDD controller 505 controls reading or writing of various data to the HD 504 by following the control of the CPU 501. The display 506 displays various information such as a cursor, a menu, a window, a character, or an image. The external device connection I/F 508 is an interface for connecting various external devices. In this case, the external device may be, for example, a Universal Serial Bus (USB) memory or a printer.

The network I/F 509 is an interface for performing data communication using a communication network. The bus line 510 is an address bus, a data bus, or the like for electrically connecting components such as the CPU 501 illustrated in FIG. 3.

The keyboard 511 is one of input means with multiple keys for inputs of characters, numbers, various instructions, and the like. The pointing device 512 is one of input means for selecting and executing various instructions, selecting a target to be processed, and moving the cursor, for example. The DVD-RW drive 514 controls the reading or writing of various data to the DVD-RW 513 as an example of a removable recording medium. The removable recording medium is not limited to a DVD-RW, and may be a DVD-R, for example. The media I/F 516 controls reading or writing (i.e., storing) data to a recording medium 515, such as a flash memory.

Functions of the information processing device of the cloud service 70 are the same as the functions of the terminal device 50. Even though the functions are different, the difference does not cause a problem in the description of the present embodiment.

Function

Figure 4:
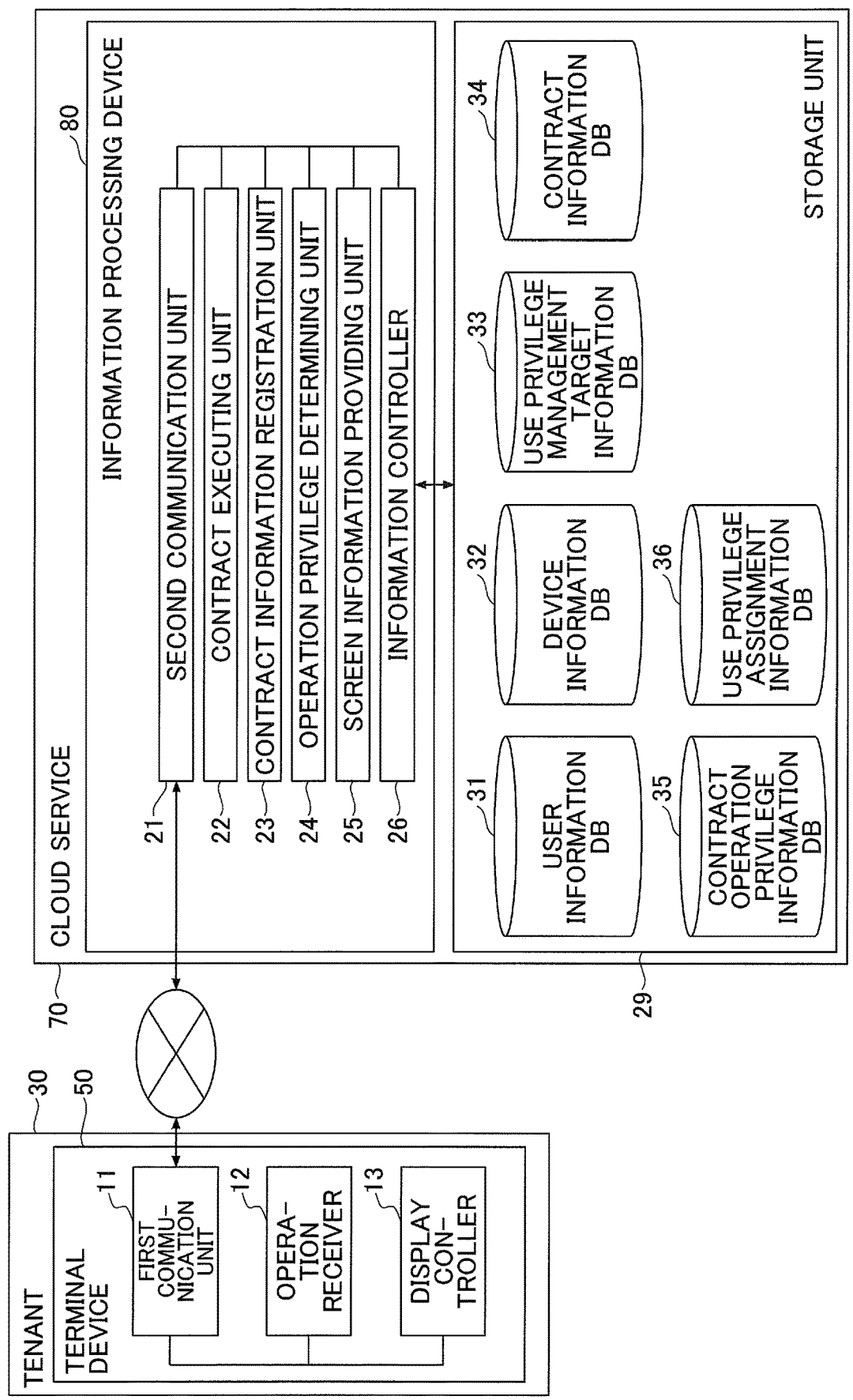
FIG. 4 is a drawing of an example of a functional block indicating each function included in the terminal device in a tenant and a cloud service by a block.

FIG. 4 is a drawing of an example of a functional block indicating each function included in the terminal device in the tenant and the cloud service 70 by a block.

Terminal Device

The terminal device 50 includes a first communication unit 11, an operation reception unit 12, and a display control unit 13. These functions included in the terminal device 50 are functions or means that are achieved by the CPU 501 executing a program loaded into the RAM 503 from the HD 504 illustrated in FIG. 3 and cooperating with various hardware.

It is assumed that the browser software is operated in the terminal device 50. However, application software specific to the cloud service may be operated.

The first communication unit 11 sends various information to the information processing device 80 of the cloud service 70 and receives various information from the information processing device 80 of the cloud service 70. According to the present embodiment, the cloud service 70 receives screen information generated with HTML or the like and sends information to be registered in various databases, which is input by the tenant administrator 8 or the contract administrator 9.

The operation reception unit 12 receives operations of the tenant administrator 8, the contract administrator 9, or the general user, to the terminal device 50. The display control unit 13 analyzes the screen information sent from the information processing device and displays a screen for operation of the tenant administrator 8, the contract administrator 9, or the general user on the display 506.

Cloud Service

The cloud service 70 includes a second communication unit 21, a contract executing unit 22, a contract information registration unit 23, an operation privilege determining unit 24, a screen information providing unit 25, and an information controller 26. These functions included in the cloud service 70 are functions or means achieved by the CPU 501 executing programs loaded into the RAM 503 from the HD 504 illustrated in FIG. 3 and cooperating with various hardware.

The second communication unit 21 sends various information to the terminal device 50 and receives various information from the terminal device 50. For example, the cloud service 70 sends the screen information generated with HTML or the like and receives information to be registered in various databases, which is input by the tenant administrator 8 or the contract administrator 9.

The contract executing unit 22 performs a process of accepting the contract of the service provided by the cloud service 70. For example, information about various services provided as a web server is provided to the terminal device 50, and information to be registered in a contract information DB 34 (e.g., a contract service, a contract type, and a contract number) is received from the terminal device 50. In addition, a contract ID is assigned.

The contract information registration unit 23 registers the information to be registered in the contract information DB 34 received by the contract executing unit 22 and the contract ID as one record of a contract table in the contract information DB 34.

The operation privilege determining unit 24 determines whether information or an operation can be displayed with the privilege of the contract administrator 9 by referring to a contract operation privilege information DB 35. The determined result is sent to the screen information providing unit 25. The screen information providing unit 25 generates the screen information using information that can be displayed with the privilege of the contract administrator 9 and generates the screen information that accepts an operation that can be performed with the privilege.

The screen information providing unit 25 generates the screen information for the terminal device 50 to display a screen operated by the tenant administrator 8 or the contract administrator 9. The screen information is described, for example, by HTML, XML, JavaScript (registered trademark), and Cascade Style Sheet (CSS). General browser software can analyze the screen information to display the screen.

The screen displayed by the screen information may be called a web page. The web page may be provided by a web application. The web application is software or a mechanism that runs on a browser by cooperation between a program in a programming language that runs on a browser (e.g., JavaScript (registered trademark)) and a program on a web server. The web page can be dynamically changed by the web application.

The screen information providing unit 25 generates the screen information including items to be registered in the database by the tenant administrator 8 or the contract administrator 9. The tenant administrator 8 or the contract administrator 9 can register or update the database by setting a value for each item.

The information controller 26 writes the information received by the second communication unit 21 to the database stored in a storage unit 29, reads the information from the database, and sends the information to the screen information providing unit 25. The screen information providing unit 25 can generate the screen information including the information of the database.

The cloud service 70 includes the storage unit 29 implemented by, for example, the HD 504, the RAM 503, or the ROM 502. In the storage unit 29, a user information DB 31, a device information DB 32, a use privilege management target information DB 33, the contract information DB 34, the contract operation privilege information DB 35, and a use privilege assignment information DB 36 are constructed. These DBs may be included in the information processing device 80 as long as these DBs exist in the network to which the cloud service 70 can access. Each database will be described in the following.

User Information DB (User Information Storage Unit

FIG. 5 is a drawing schematically illustrating an example of a user table stored in the user information DB 31. The user table stores a role of the user who is under the management of the tenant. That is, a role is registered in association with the user ID. The role includes the tenant administrator 8, the contract administrator 9, and the general user. The user ID is identification information for uniquely identifying the user. ID stands for identification and indicates identifier or identification information. The ID is a name, a symbol, a character string, a numeric value, or one or more of these combinations used to uniquely distinguish a particular object among multiple objects. The same applies to the following IDs. In the embodiment, the role indicates what privilege the user has. The main roles in the embodiment are the tenant administrator 8, the contract administrator 9, and the general user, but another role may be provided.

- The tenant administrator 8 is a person who manages the entire tenant and has all the privileges that can be performed in the tenant. The tenant administrator 8 also has the privilege of the contract administrator 9.
- The general user has the privilege to use the cloud service 70.
- The contract administrator 9 has the privilege related to the contract (conclusion of the contract, update of the contract, and deletion of the contract).

Device Information DB (Device Information Storage Unit)

FIG. 6 is a drawing schematically illustrating an example of a device table stored in the device information DB 32. The device table stores information of the device that is under the management of the tenant, and the device indicates the device 10. That is, the device name is registered in association with the device ID. The device ID is identification information that uniquely identifies the device 10. The device name is the name of the device 10 (e.g., a product name and a model number).

Use Privilege Management Information DB (Use Privilege Management Information Storage Unit)

FIG. 7 is a drawing schematically illustrating an example of a use privilege management target table stored in the use privilege management target information DB 33. One record (i.e., one line of the database) is created in the use privilege management target table for each contract administrator 9 added by the tenant administrator 8. A management target ID is registered in association with a contract administrator ID. The management target ID is the user ID of the general user and the device ID that are managed by the contract administrator 9. Thus, a target of which the use privilege can be managed by the contract administrator 9 is registered in the use privilege management target information DB 33. The tenant administrator 8 and the contract administrator 9 can edit the management target ID.

Contract Information Database (Contract Information Storage Unit)

FIG. 8 is a drawing schematically illustrating an example of a contract table stored in the contract information DB 34. In the contract table, information related to a service of the cloud service 70 contracted by the contract administrator 9 is registered as a record (one record is created for a contract). That is, a contract service, a contract type, and a contract number are registered in association with the contract ID. The contract ID is identification information that uniquely identifies the contracted service. The contract service is the name of a contracted service, for example. The contract type indicates whether a contract is related to the general user or the device. The contract number is the number of general users or devices 10 that can use the service at the same time. One record in the contract table is updated when the contract administrator 9 updates the contract of the service.

Contract Operation Privilege Information DB (Contract Operation Privilege Information Storage Unit)

FIG. 9 is a drawing schematically illustrating an example of a contract operation privilege table stored in a contract operation privilege information DB 35. One record is created for a contract in the contract operation privilege information DB 35. The operation privilege of the contract administrator 9 is registered in the contract operation privilege table. That is, the user ID of the contract administrator 9 and operation types (i.e., a contract operation, an update operation, and a deleting operation) in the cloud service 70 are registered in association with the contract ID. In FIG. 9, the operation type with "YES" indicates having the operation privilege, and the operation type with "NO" indicates having no operation privilege. For the contract administrator 9 who contracts the cloud service 70, all operation types are automatically set to "YES".

The tenant administrator 8 or the contract administrator 9 may add the contract administrator 9 (one record is created). The tenant administrator 8 can edit all records.

Use Privilege Assignment Information DB (Use Privilege Assignment Information Storage Unit)

FIG. 10 is a drawing schematically illustrating an example of a use privilege assignment table stored in the use privilege assignment information DB 36. The use privilege assignment table registers which user or device 10 a contract of the cloud service 70 is assigned to. That is, the user ID or the device ID to be assigned is registered in association with the contract ID. The contract administrator 9 assigns the user or the device 10.

Relationship of the Service, the Contract, the Use Privilege, the User, the Tenant Administrator 8, and the Contract Administrator 9

Figure 11:
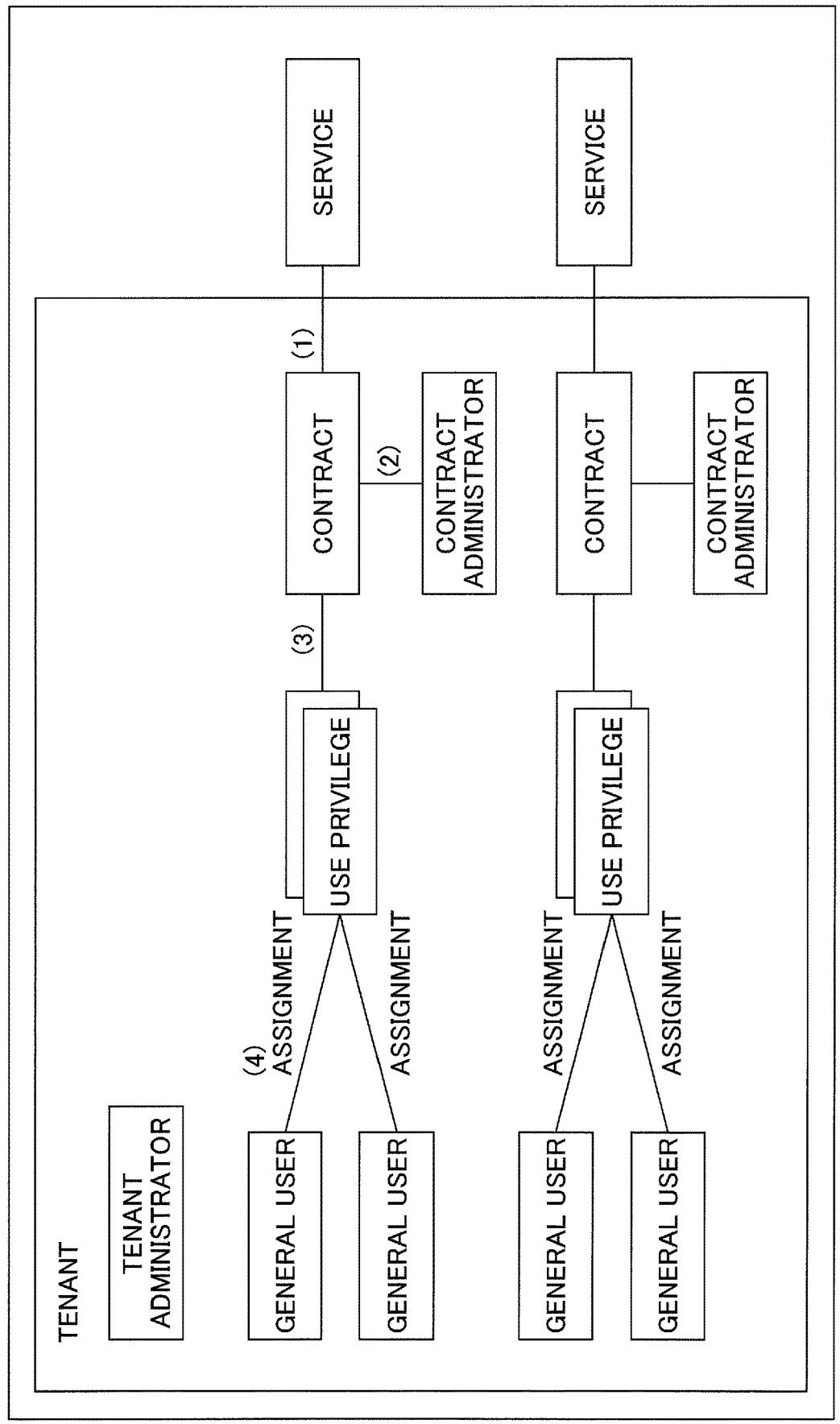
FIG. 11 is a drawing schematically illustrating a service, a use privilege, a contract administrator, and a general user that are associated with a contract.

Next, the relationship of the service, the contract, the use privilege, the user, the tenant administrator 8, and the contract administrator 9 will be described with reference to FIG. 11. FIG. 11 is a drawing schematically illustrating the service, the use privilege, the contract administrator 9, and the general user that are associated with a contract.

First, the tenant administrator 8 exists in each tenant. The tenant administrator 8 has the operation privilege of all operation types for all services contracted by the tenant. For example, the tenant administrator 8 can view the contract contents of another department and can use the use privilege of another department. Conventionally, there has been no mechanism for giving an operation privilege between the operation privileges of the tenant administrator 8 and the general user. In the present embodiment, the tenant administrator 8 specifies the contract administrator 9 who has the operation privilege between the operation privileges of the tenant administrator 8 and the general user.

(1) The contract administrator 9 contracts a service provided by the cloud service 70. This allows the general user or the device 10 of the tenant to obtain the use privilege of the service provided by the cloud service 70 within the scope of the contract. A record is registered in the contract table in accordance with the contract contents.

(2) Based on the contract, the cloud service 70 registers information related to the contract in the contract operation privilege table. When the contract administrator 9 makes the contract, the user ID of the contract administrator 9 identified by logging in, is registered in the contract operation privilege table in association with the assigned contract ID. The items of the contract operation, the update operation, and the deleting operation are automatically registered to be "YES". The contract administrator 9 or the tenant administrator 8 can change the setting.

(3) The tenant administrator 8 sets the management target to the contract administrator 9 in advance. That is, the contract administrator 9 and the management target are registered in the use privilege management target table. This corresponds to the delegation of the use privilege.

(4) The contract administrator 9 assigns the use privilege of the contracted service to at least either the general user or the device 10 within the delegated use privilege. That is, at least either the user ID or the device ID is registered in the use privilege assignment table.

The contract administrator 9 performs the above-described process for each service. Thus, the contract administrator 9, the use privilege management target, and the use privilege are associated with each service. Since the operation privilege of the contract administrator 9 is set for each operation type, the privilege delegated to the contract administrator 9 is limited, thereby preventing an operation that only the tenant administrator 8 has a privilege to perform from being performed by the contract administrator 9 and reducing unintentional erroneous operations.

Operation Procedure

In the following, a flow of each process performed by the service system will be described with reference to FIGS. 12 to 16.

Register to the Use Privilege Management Target Table

Figure 12:
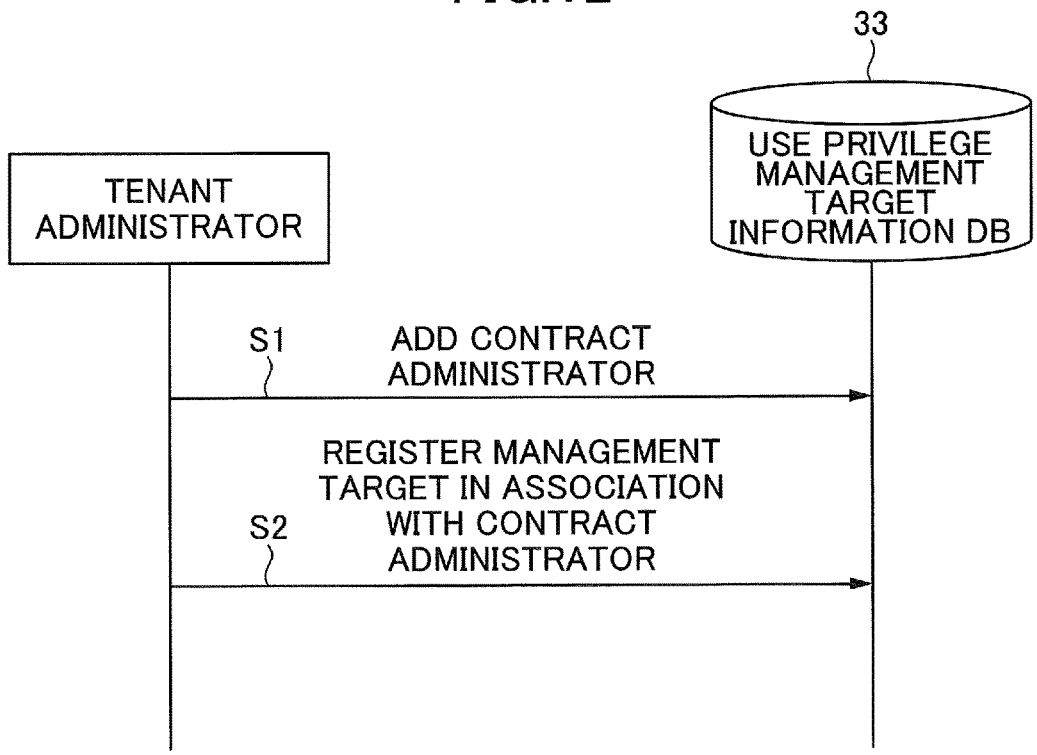
FIG. 12 is a sequence diagram illustrating an example of a procedure in which a tenant administrator registers a contract administrator and a management target in the use privilege management target table.

FIG. 12 is a sequence diagram illustrating an example of a procedure in which the tenant administrator 8 registers the contract administrator 9 and the management target in the use privilege management target table.

S1: The tenant administrator 8 operates the terminal device 50 to register the contract administrator 9 in the use privilege management target table of the use privilege management target information DB 33. The contract administrator 9 is registered with the contract administrator ID. The operation reception unit 12 of the terminal device 50 receives the operation, and the first communication unit 11 sends the contract administrator ID to the cloud service 70. The second communication unit 21 of the cloud service 70 receives the contract administrator ID, and the information controller 26 registers the contract administrator ID in the use privilege management target information DB 33.

S2: The tenant administrator 8 operates the terminal device 50 to register the management target in the use privilege management target table of the use privilege management target information DB 33. The management target is specified by the user ID or the device ID. The operation reception unit 12 of the terminal device 50 receives the operation, and the first communication unit 11 sends the management target ID to the cloud service 70. The second communication unit 21 of the cloud service 70 receives the management target ID, and the information controller 26 registers the management target ID in the use privilege management target information DB 33 in association with the contract administrator ID.

As a result of the above, the use privilege is delegated from the tenant administrator 8 to the contract administrator 9.

Edit the Use Privilege Management Target Table

Figure 13:
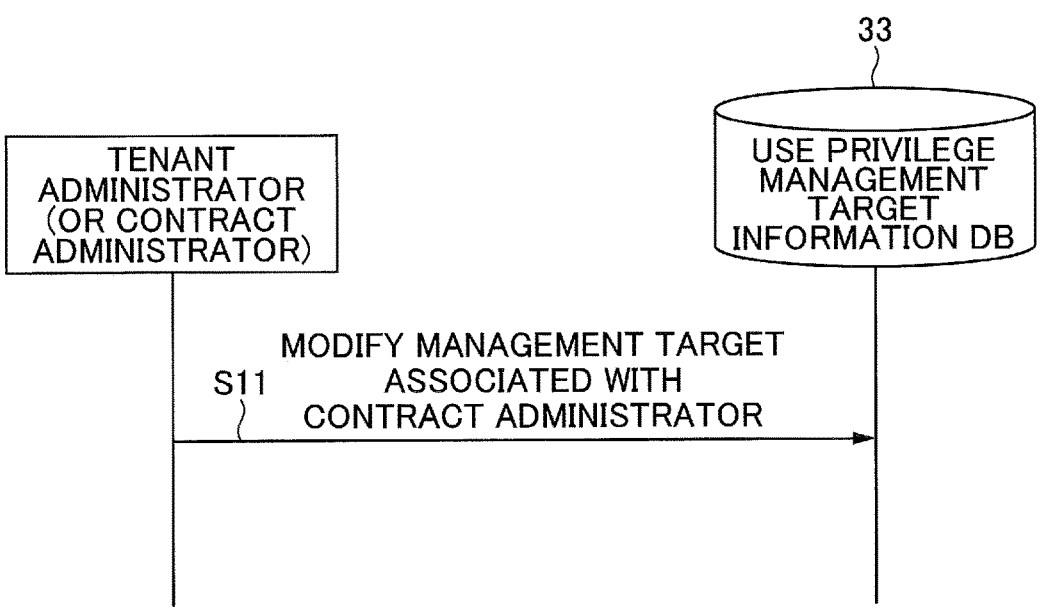
FIG. 13 is a sequence diagram illustrating an example of a procedure in which the tenant administrator or the contract administrator edits a management target registered in the use privilege management target table.

FIG. 13 is a sequence diagram illustrating an example of a procedure in which the tenant administrator 8 or the contract administrator 9 edits the management target registered in the use privilege management target table.

S11: The tenant administrator 8 or the contract administrator 9 operates the terminal device 50 to edit the management target of the contract administrator 9 already registered in the use privilege management target table. Editing in this case includes registering a new management target and deleting a previously registered management target. The management target is specified by the user ID or the device ID. The operation reception unit 12 of the terminal device 50 receives the operation and the first communication unit 11 sends the management target ID to be registered or deleted to the cloud service 70 with a notification of registration or deletion. Since the second communication unit 21 of the cloud service 70 receives the management target ID with the notification of registration or deletion, the information controller 26 registers or deletes the management target ID in the use privilege management target information DB 33 depending on the notification of registration or deletion.

As described above, the general user or the device 10 is associated with the contract administrator 9 as the management target. Therefore, among the privileges held by the tenant administrator 8, a privilege related to the use privilege that determines which service can be used by the general user or the device 10 is delegated to the contract administrator 9.

Contract

Figure 14:
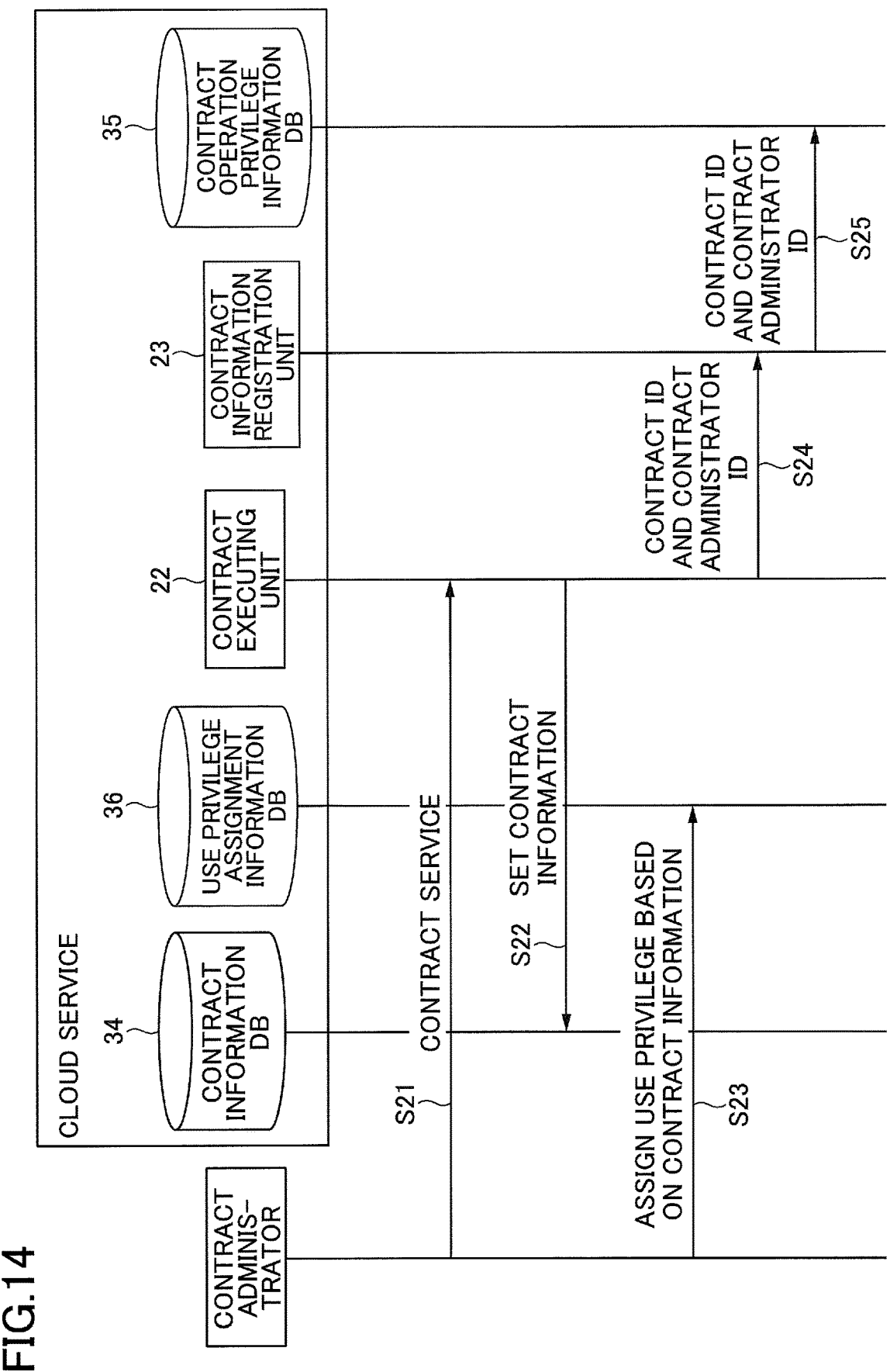
FIG. 14 is a sequence diagram illustrating an example of a procedure in which the contract administrator contracts a service and registers information in the contract information DB and the use privilege assignment information DB.

FIG. 14 is a sequence diagram illustrating an example of a procedure in which the contract administrator 9 contracts a service and registers information in the contract information DB 34 and the use privilege assignment information DB 36.

S21: The contract administrator 9 operates the terminal device 50 to cause the terminal device 50 to communicate with the cloud service 70 to contract a service. That is, the contract administrator 9 selects the service name, the contract type, and the contract number, and applies for the contract to the cloud service 70. The operation reception unit 12 of the terminal device 50 accepts the operation and the first communication unit 11 sends the service name, the contract type, and the contract number with a notification of intending to make the contract to the cloud service 70.

The contract administrator ID has been identified by the contract administrator 9 logging in the cloud service 70, and the contract administrator ID is identified when applying for the contract.

S22: The second communication unit 21 of the cloud service 70 receives these data, and the contract executing unit 22 assigns a unique contract ID. The contract information registration unit 23 registers information corresponding to one record of the contract table in the contract information DB 34.

S23: The contract administrator 9 registers the use privilege of the general user or the device based on the contract information in the use privilege assignment information DB 36. The contract ID is a value that is set in the contract information DB 34. A target is selected from the management target IDs managed by the contract administrator 9 in the use privilege management target information DB 33 and the target is assigned. The operation reception unit 12 of the terminal device 50 receives the operation, and the first communication unit 11 sends the contract ID and the target to be assigned to the cloud service 70. The second communication unit 21 of the cloud service 70 receives the contract ID and the target to be assigned, and the information controller 26 registers the target to be assigned in the use privilege assignment information DB 36 in association with the contract ID.

S24: The contract executing unit 22 notifies the information controller 26 of the contract ID and the contract administrator ID. With respect to the contract administrator ID, a user ID of the contract administrator 9 that is determined when the contract administrator 9 logs in the cloud service 70, is used. This enables a new role that is the contract administrator to be associated with the contract operation privilege.

S25: The information controller 26 registers the contract ID and the contract administrator ID in one record of the contract operation privilege table in association with each other. After referring to the user information DB to check that a role associated with the contract administrator ID is the contract administrator, all operation privileges are set to "YES".

Thus, when the contract administrator 9 contracts the service, one record is automatically registered in the contract operation privilege table. Since the operation privileges of the contract operation, the update operation of the contract, and the deleting operation of the contract are registered in the contract operation privilege table, the privilege related to the contract among the privileges of the tenant administrator 8 is delegated to the contract administrator 9. The use privilege management target table and the use privilege assignment table associate the use privilege, the contract administrator 9, and the use privilege management target, so that the privilege related to the use privilege is assigned to the contract administrator 9.

Setting of the Contract Administrator 9

Figure 15:
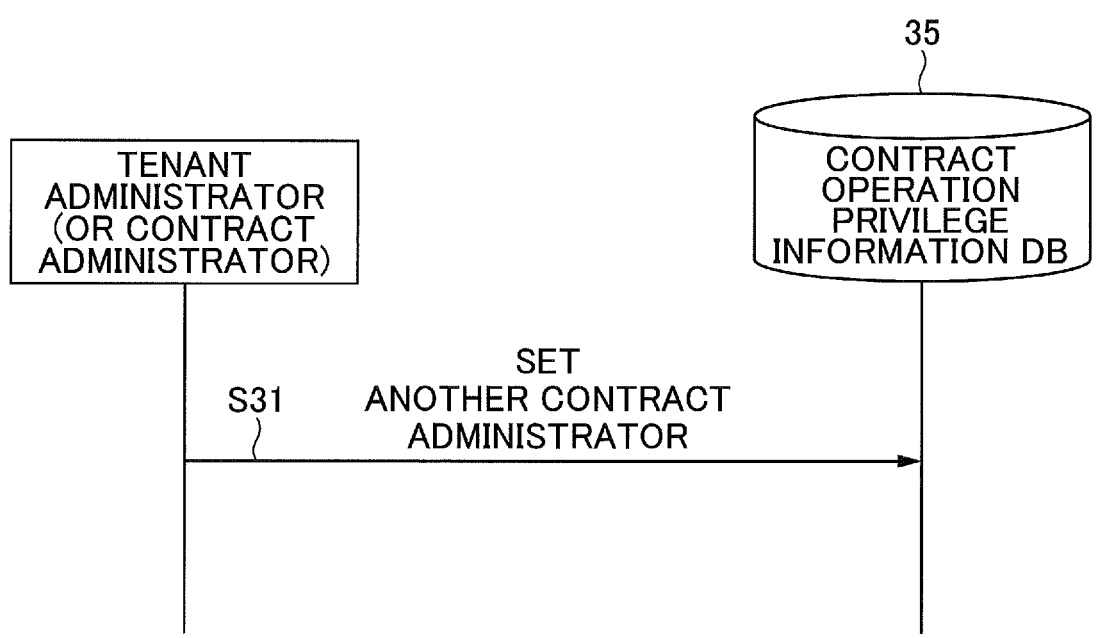
FIG. 15 is a sequence diagram illustrating an example of a procedure in which the tenant administrator or the contract administrator registers another contract administrator in the contract operation privilege information DB.

FIG. 15 is a sequence diagram illustrating an example of a procedure in which the tenant administrator 8 or the contract administrator 9 registers another contract administrator in the contract operation privilege information DB 35.

S31: The tenant administrator 8 or the contract administrator 9 may operate the terminal device 50 to register another contract administrator 9 in the contract operation privilege information DB 35. Thus, another user ID is set or added to the item of the contract administrator 9 in the contract operation privilege table. "YES" or "NO" is set for each of the contract operation, the update operation, and the deleting operation. The operation reception unit 12 of the terminal device 50 receives the operation, and the first communication unit 11 sends the user ID of the contract administrator 9 and "YES" or "NO" of each of the contract operation, the update operation, and the deleting operation, to the cloud service 70.

The second communication unit 21 of the cloud service 70 receives the data, and the information controller 26 sets the user ID of the contract administrator 9 received by the second communication unit 21 to the item of the contract administrator 9 of the contract operation privilege table, and sets "YES" or "NO" received by the second communication unit 21 to each item of the contract operation, the update operation, and the deleting operation.

Therefore, the tenant administrator 8 or the contract administrator 9 can change the contract administrator 9 and the operation privilege in the contract operation privilege information DB 35 automatically registered by the contract, as desired.

Operation by the Contract Administrator to the Cloud Service

Figure 16:
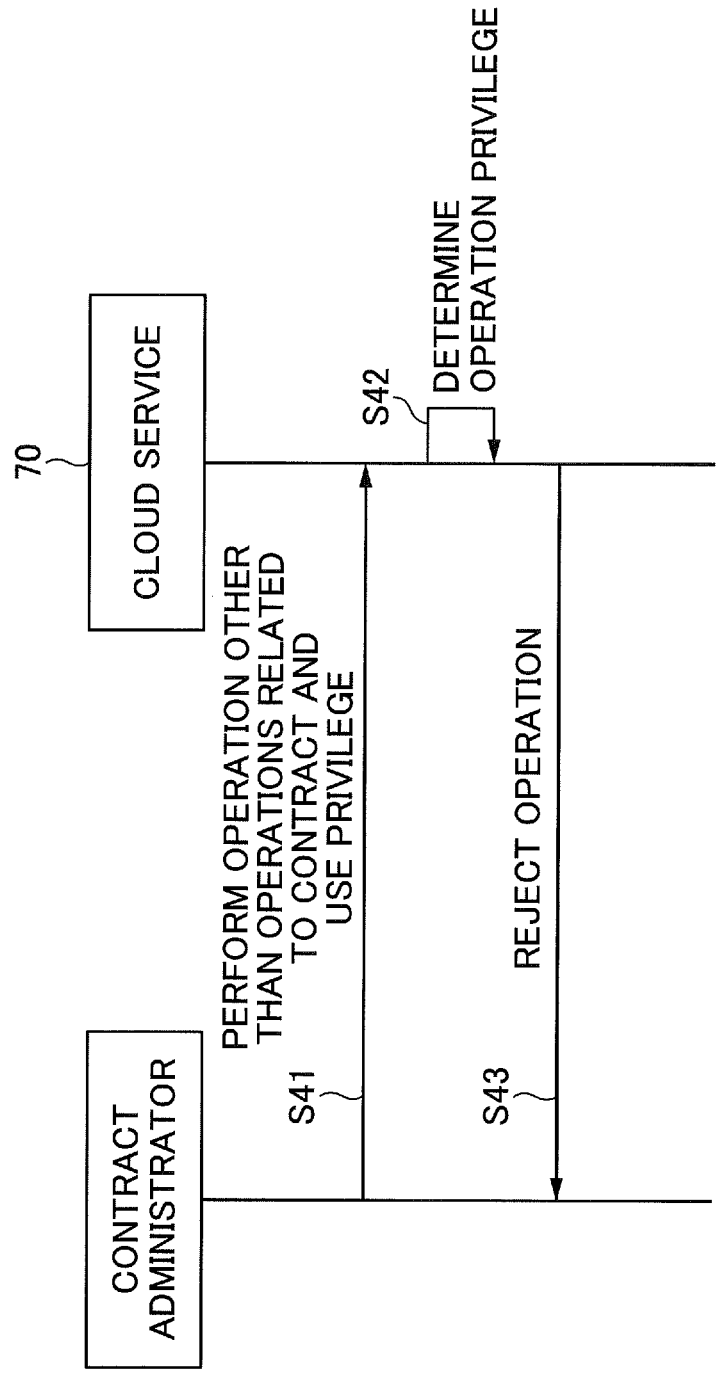
FIG. 16 is a sequence diagram illustrating an example of a procedure in which the contract administrator performs an operation other than operations related to a contract and a use privilege on a cloud service.

FIG. 16 is a sequence diagram illustrating an example of a procedure in which the contract administrator 9 performs an operation other than an operation related to the contract and an operation related to the use privilege on the cloud service 70.

S41: The contract administrator 9 operates the terminal device 50 to request the cloud service 70 to perform an operation other than an operation related to the contract and an operation related to the use privilege with the contract administrator ID. The operation includes, for example, an operation in which "YES" is not registered in the contract operation privilege information DB 35, an operation to view the contract contents of another department, or an operation to use the use privilege of another department. The operation reception unit 12 of the terminal device 50 receives the operation, and the first communication unit 11 sends the contract administrator ID and the operation other than the operation related to the contract and the operation related to the use privilege, to the cloud service 70.

S42: The second communication unit 21 of the cloud service 70 receives the request, and the operation privilege determining unit 24 checks the operation privilege associated with the contract administrator ID of the contract administrator 9 logging in, in the contract operation privilege information DB 35.

S43: Since the operation privilege other than the operation privileges related to the contract and the use privilege is not given to the contract administrator 9, the operation privilege determining unit 24 sends a rejection of the operation to the terminal device 50 operated by the contract administrator 9.

As described above, in the present embodiment, an operation privilege other than the operation privileges related to the contract and the use privilege is not given to the contract administrator 9, thereby preventing the contract administrator 9 from viewing the contract contents of another department or using the use privilege of another department.

Summary

The description above is summarized as follows.
(1) Only the privilege related to the contract and the privilege related to the use privilege among the administrative privileges of the tenant administrator 8 are delegated to the contract administrator 9.
(2) When the contract administrator 9 contracts the cloud service 70, the use privilege, the contract administrator 9, and the use privilege management target are associated with each other.

As a result, the privilege to be delegated to the contract administrator 9 is limited, thereby preventing an operation that only the tenant administrator 8 has a privilege to perform from being performed by the contract administrator 9 and reducing unintentional erroneous operations. The contract administrator 9 can assign the user privilege to the general user and the device. A burden on the tenant administrator 8 can be reduced.

Other Application Examples

The preferred embodiment of the present invention has been described with reference to the embodiment, but the present invention is not limited to the embodiment. Various modifications and substitutions can be made without departing from the spirit and scope of the invention.

The configuration example illustrated in FIG. 4 in the above-described embodiment is divided according to the main functions for ease of understanding of the process of the service system 100. However, the present invention is not limited by a method of dividing into each processing unit or the name of each processing unit. The service system 100 may be divided into more processing units depending on processing contents. Alternatively, the service system 100 may be divided such that one processing unit includes more processes.

The devices described in the embodiment indicates only one of multiple computing environments for achieving the embodiment disclosed in the present specification. In one embodiment, the information processing device 80 includes multiple computing devices such as a server cluster. The multiple computing devices are configured to communicate with each other through a given type of communication link including a network and a shared memory, and perform the processes disclosed in the present specification.

Each function of the embodiment described above can be achieved by one or more processing circuits. Here, the "processing circuit" in the present specification includes a processor programmed to perform each function by software, such as a processor implemented by electronic circuits, and a device such as an application specific integrated circuit (ASIC), a digital signal processor (DSP), a field programmable gate array (FPGA), and a conventional circuit module that are designed to perform each function as described above.

What is claimed is:
1. A service system comprising:
a server that provides a service to a contracted tenant as a cloud service; and
a device that receives the service provided by the server, wherein the server can communicate with the device through a network,
wherein a terminal device that is operated by a contract administrator sends identification information of the contract administrator and information related to a contract of the service, to the server, and
wherein the server includes
a user information storage unit that stores identification information of a user for each of a plurality of users including the contract administrator, and specifies a role as the contract administrator associated with the identification information of the contract administrator,
a communication unit that receives the identification information of the contract administrator and the information related to the contract of the service, and
an information registration unit that registers the identification information of the contract administrator, contract identification information generated based on the contract, and an operation privilege related to the contract based on the role associated with the identification information of the contract administrator specified in the user information storage unit, in association with each other, in a contract operation privilege information storage,
wherein the service system comprises a use privilege management target information storage unit that associates the identification information of the contract administrator with identification information of a general user and the device that can be assigned to the service by the contract administrator.

2. The service system as claimed in claim 1, comprising a use privilege assignment information storage unit that associates the contract identification information with the identification information of the general user and the device that can use the service.

3. The service system as claimed in claim 2, wherein among privileges of a tenant administrator who manages the contracted tenant, only the operation privilege related to the contract and a privilege related to a use privilege that assigns the service to the general user and the device are delegated to the contract administrator.

4. The service system as claimed in claim 3, comprising a contract information storage unit that stores the contract identification information, a type of the service, and a contract number that are received from the terminal device, in association with each other, when the contract administrator contracts the service.

5. The service system as claimed in claim 1, wherein the operation privilege is a privilege of a contract operation related to the contract, an update operation of the contract, and a deleting operation of the contract.

6. An information registration method performed by a service system including a server that provides a service to a contracted tenant as a cloud service, and a device that receives the service provided by the server, wherein the server can communicate with the device through a network, the information registration method comprising:

sending, by a terminal device that is operated by a contract administrator, identification information of the contract administrator and information related to a contract of the service, to the server, receiving, by the server, the identification information of the contract administrator and the information related to the contract of the service, and registering the identification information of the contract administrator, contract identification information generated based on the contract, and an operation privilege related to the contract based on a role associated with the identification information of the contract administrator specified in a user information storage unit, in association with each other, in a contract operation privilege information storage, and registering identification information of a general user and the device that can be assigned to the service by the contract administrator in association with the identification information of the contract administrator.

* * * * *